(12) United States Patent
LaBadie et al.

(10) Patent No.: US 7,356,502 B1
(45) Date of Patent: Apr. 8, 2008

(54) INTERNET BASED PAYMENT SYSTEM

(75) Inventors: Timothy LaBadie, Novato, CA (US); Robert Ficarra, Sebastopol, CA (US); Paul H. Green, Petaluma, CA (US)

(73) Assignee: CrossCheck, Inc., Rohnert Park, CA (US)

( * ) Notice: Subject to any disclaimer, the term of this patent is extended or adjusted under 35 U.S.C. 154(b) by 0 days.

(21) Appl. No.: 09/259,619

(22) Filed: Mar. 1, 1999

Related U.S. Application Data

(60) Provisional application No. 60/076,665, filed on Mar. 3, 1998.

(51) Int. Cl.
*G06Q 40/00* (2006.01)
*G06Q 30/00* (2006.01)
*G06F 17/30* (2006.01)

(52) U.S. Cl. .................... 705/38; 705/26; 705/27; 705/35; 705/39; 705/42; 705/43

(58) Field of Classification Search ............. 705/26, 705/38–40, 35, 1, 42, 43, 27; 380/51; 235/379
See application file for complete search history.

(56) References Cited

U.S. PATENT DOCUMENTS

| | | | |
|---|---|---|---|
| 4,264,808 A | | 4/1981 | Owens et al. |
| 4,888,812 A | * | 12/1989 | Dinan et al. ............... 382/140 |
| 5,247,575 A | | 9/1993 | Sprague et al. |
| 5,383,113 A | * | 1/1995 | Kight et al. ................ 705/40 |
| 5,484,988 A | | 1/1996 | Hills et al. ................. 236/379 |
| 5,504,677 A | | 4/1996 | Pollin |
| 5,592,377 A | | 1/1997 | Lipkin |
| 5,621,201 A | | 4/1997 | Langhans et al. |
| 5,677,955 A | * | 10/1997 | Doggett et al. ............. 705/76 |
| 5,679,940 A | * | 10/1997 | Templeton et al. ......... 235/380 |
| 5,715,314 A | | 2/1998 | Payne et al. ................ 380/24 |
| 5,724,424 A | | 3/1998 | Gifford ...................... 380/24 |
| 5,781,654 A | | 7/1998 | Carney |
| 5,794,207 A | * | 8/1998 | Walker et al. .............. 705/26 |
| 5,832,464 A | | 11/1998 | Houvener et al. |
| 5,898,779 A | | 4/1999 | Squilla et al. |

(Continued)

FOREIGN PATENT DOCUMENTS

EP 661654 A2 * 5/1995

(Continued)

OTHER PUBLICATIONS

Whittelsey, F. C. "Taking orders by phone check." Nation's Business vol. 85, No. 1, pp. 66(reprinted), Jan. 1997.*

(Continued)

*Primary Examiner*—Ella Colbert
(74) *Attorney, Agent, or Firm*—Quarles & Brady

(57) ABSTRACT

An internet based payment validation system links a customer computer to a third party processor computer after the customer, communicating with the a merchant computer over the Internet, indicates a desire to pay for a purchase directly and not with a credit card. The processor computer receives information from the customer identifying the customer then applies the identification to a statistical database indicating whether a payment obligation is likely to be honored. The processor computer then returns to the merchant computer an indication of whether a payment obligation should be accepted.

12 Claims, 2 Drawing Sheets

U.S. PATENT DOCUMENTS

| | | | | |
|---|---|---|---|---|
| 5,946,669 | A * | 8/1999 | Polk | 705/38 |
| 5,963,925 | A * | 10/1999 | Kolling et al. | 705/40 |
| 5,970,475 | A * | 10/1999 | Barnes et al. | 705/27 |
| 5,987,132 | A * | 11/1999 | Rowney | 705/26 |
| 6,041,315 | A * | 3/2000 | Pollin | 705/44 |
| 6,098,053 | A * | 8/2000 | Slater | 705/35 |
| 6,125,349 | A * | 9/2000 | Maher | 705/37 |
| 6,138,107 | A * | 10/2000 | Elgamal | 705/39 |
| 6,189,785 | B1 | 2/2001 | Lowery | |
| 6,856,965 | B1 * | 2/2005 | Stinson et al. | 705/21 |
| 2001/0037299 | A1 * | 11/2001 | Nichols et al. | 705/42 |

FOREIGN PATENT DOCUMENTS

WO  WO 97/02538 A1 *  1/1997

OTHER PUBLICATIONS

Emerson, D. "New technology enhances ATMs." Minneapolis-St Paul CityBusiness vol. 14, No. 9, pp. 18, Aug. 1996.*

Anonymous. "Banks Vie to Offer Imaged Checks to Cash Managers." Document Imaging Report vol. 5, No. 4, pp. N/A(reprinted), Feb. 1995.*

Anonymous. "Image: Banks See Pennies Saved, Pennies Earned From New Imaging Technology." Report on IBM vol. 7, No. 12, pp. N/A(reprinted), Mar. 1990.*

Anonymous. "Check Writing On The Web." Bank Technology News vol. -, No. -, pp. N/A, Jul. 1998.*

Epper, K. "Bank partner sought for Internet check system.(Netchex of Phoenix, Arizona)." American Banker vol. 160, No. 108, p. 16(reprinted), Jun. 1995.*

Anonymous. "Netchex Eyes Internet Electronic Checking." Item Processing Report vol. 6, No. 14, pp. N/A, Jul. 1995.*

Anonymous. "Checks' Web Mate: the E-Check." Financial Service ONLINE vol. -, No. -, pp. 49+(reprinted), Jan. 1998.*

Anonymous. "Checking Out On the Internet." Financial Service ONLINE vol. -, No. -, pp. 61+(reprinted), May 1996.*

Anonymous. "Telecom Advances May Cause Overhaul of Checking Industry." Financial Services Report vol. 9, No. 4, pp. 5(3)(reprinted), Feb. 1992.*

PR Newswire "Online Shoppers Can Now Pay by Check—over the Internet." PR Newswire vol. -, No. -, pp. 426(reprinted), Apr. 26, 1996.*

Doggett, John; "Electronic Checks-A Detailed Preview"; Journal of Retail Banking Services; vol. 18; No. 2; Summer 1996; pp. 1-10.*

Wallys W. Conhaim; "Link-up"; Medfor; Mar./Apr. 1998; vol. 15; Issue 2; pp. 1-8.*

Frances Cera Whittelsey, Taking orders by phone check, Nations' Business, V85n1, p. 1.

* cited by examiner

INTERNET BASED PAYMENT SYSTEM

CROSS-REFERENCE TO RELATED APPLICATIONS

This application claims the benefit of U.S. provisional application 60/076,665 filed Mar. 3, 1998 hereby incorporated by reference.

BACKGROUND OF THE INVENTION

It is widely expected that the Internet, and in particular, the World Wide Web will provide an important source of retail commerce with customers shopping via their computers. These computers will communicate with other computers through the well known conventions of the Internet and World Wide Web with "Web sites" displaying various services and merchandise for sale by merchants anywhere in the virtual community of the Web.

Typically, current Web-based transactions involve a customer identifying merchandise on the merchant's Web site to be collected in a virtual "shopping basket". When the selection process is complete, the customer concludes the order by entering his or her shipping address and preferences for shipping and a method of payment. At this time, the method most frequently used will be a credit card. The customer will input a credit card number and expiration date (normally encrypted for security) and the merchant will have the transaction amount approved by the credit card company for immediate shipping of the merchandise. The credit card company pays the merchant directly and then bills the customer.

While such a system is relatively convenient for holders of credit cards, it effectively excludes from this growing commercial system those who, for whatever reason, prefer to not use credit cards but to pay "directly", for example, by check, money order, cash or other similar direct payment. While some "on-line" merchants may accept checks, typically they must hold the merchandise until the check is received, defeating much of the convenience of Internet shopping. The reason for this is that checks and other direct payments differ fundamentally from credit cards. With credit cards, the merchant, via the agency of the credit card company, has far greater knowledge about the customer and thus greater assurance of being paid. A merchant accepting a direct payment over the Internet faces the risk that the payment will not be received and further that if the payment is a check, once received, it will not be honored by the deposit institution. Generally, detailed information about the customer from the deposit institution is not available and even if the amount of the funds deposited in the relevant account by the customer were known, the time required for the check to be presented could significantly affect whether it is honored.

What is needed is a system allowing for efficient use of direct payment for Internet purchases.

SUMMARY OF THE INVENTION

The present invention provides a method of validating internet direct payment through a linkable, on-line database providing statistical data relevant to the probability of the payment obligation being honored. If the indication is that the payment obligation will be honored, the merchant may accept such payment. If the payment obligation is to be satisfied by a check, the check may then be electronically printed at the merchant site or submitted directly to the banking system. Confidential information submitted by the customer for the purpose of evaluating the probability of payment being honored is shielded from the merchant and no special Internet conventions are required to communicate the validation to the merchant who may simply examine an Internet based folder for authorizations at arbitrary intervals.

Specifically then, the present invention provides an Internet-based payment validation system including three Internet linked computers. First, a merchant computer is programmed to communicate with the Internet to create an Internet site listing product for sale and indicating a direct-payment option. Second, a customer computer is programmed to communicate on the Internet and to communicate with the merchant computer to identify product desired to be purchased and to select the direct payment option, the customer computer is further programmed to accept at least one unique customer identifier from a customer and communicate the same over the Internet. Finally, a processor computer is programmed to receive at least one customer identifier from the merchant computer in response to a selection of the direct payment option. The processor computer further includes a data structure matching the customer identifier to at least one statistical element indicating a probability of a payment obligation by the customer being honored, and based on that matching statistical element, transmitting to the merchant computer an authorization indication indicating whether direct payment for the product should be accepted. The statistical element may include information about the customer (such as a payment history), or about the transaction (the type and price of goods) or about the customer supplied data (legitimacy of driver license or check numbers).

Thus it is one object of the invention to allow practical direct payment for purchases over the Internet where the parties are geographically remote and do not have a preexisting relationship for example a contractual relationship or even a history of previous business dealings. The statistical information of the processor computer substitutes for informal evaluation mechanisms used in traditional face-to-face commerce.

It is another object of the invention to provide some security to personal customer information necessary to validate a transaction. By separation of the merchant computer and the processor computer, the merchant need not have access to the customer information or statistical information.

It is another object of the invention to provide the customer and merchant with the benefits of the customer's aggregate purchase history with respect to isolated purchases from a single merchant. The statistical information may collect information from multiple transactions with many merchants providing greater assurance of payment for any one transaction than a single merchant might be able to obtain.

It is yet another object of the invention to simplify Internet transactions. The use of a single purchaser computer servicing many merchants allows a simplified single point of data entry allowing future purchases to be made with simplified customer identification.

The authorization indication may be, for example, not authorized, indicating that the acceptance of direct payment is not advised, authorized with no guarantee, indicating that the acceptance of direct payment is acceptably subject to the discretion of the merchant, and authorized with guarantee, indicating that the amount of the direct payment will be guaranteed by the processor.

Thus it is another object of the invention to provide the merchant with some latitude in accepting purchases.

The unique customer identifier may be a driver's license number, phone number, bank transit and routing number from a check or a combination of all of these and an arbitrary personal identifier number for the customer.

Thus it is another object of the invention to permit the identification of geographically remote customers on the Internet.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

DETAILED DESCRIPTION OF THE PREFERRED EMBODIMENT

Figure 1:
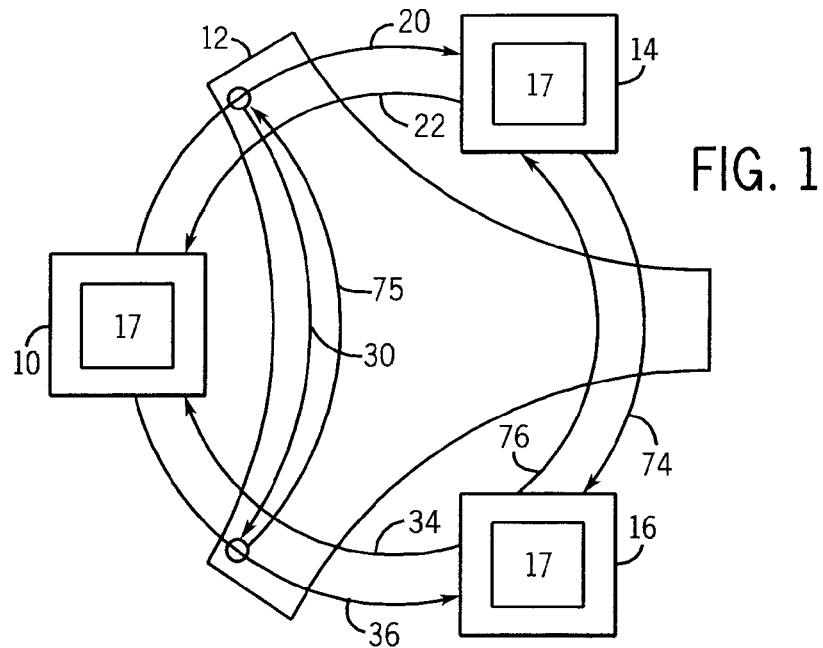
FIG. 1 is a schematic view of three computers connected to each other on the Internet, including a customer computer, a merchant computer and an authorization computer, showing the paths of communication between the computers during operation of the present invention.

Referring now to FIG. 1, a customer computer 10, such as may be a PC style computer or so-called Web TV or other computing device, provides a terminal including means for connecting to the Internet 12, a customer, on customer computer 10 may communicate with a merchant computer 14 and also with an authorizing computer 16 according to methods well understood in the art.

Figure 3:
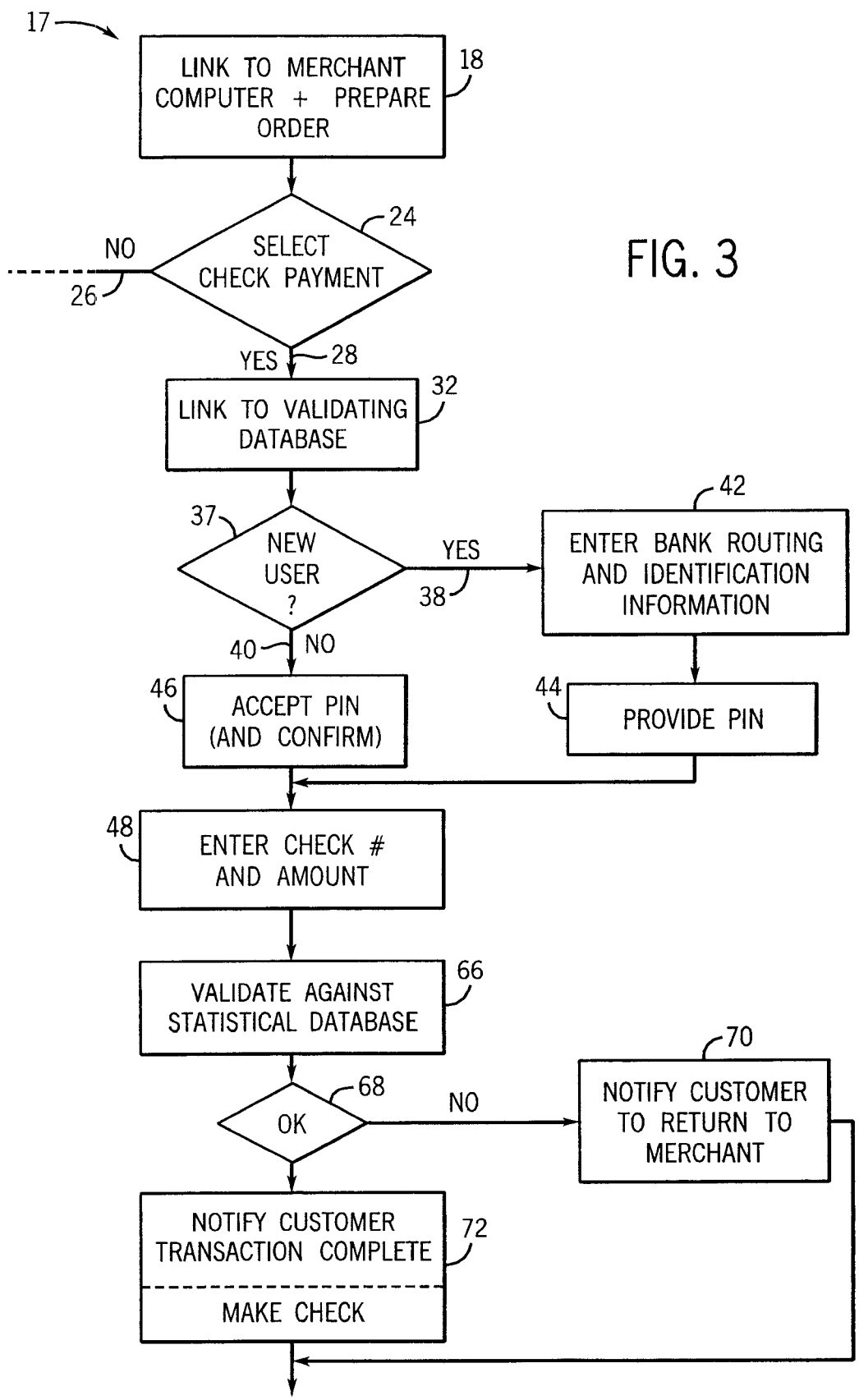
FIG. 3 is a flowchart describing the programming of the computers in FIG. 1 in the present invention.

Referring now to FIGS. 1 and 3, each of the computers 10, 14, and 16 include software to collectively execute a program 17 for the processing of a purchase transaction and payment by check. Generally the portion of this program 17 in the customer computer 10 is a conventional browser such as is manufactured by Netscape and Microsoft as well as others. The portion of the program 17 in the merchant computer 14 includes a Web site as may be authored through a number of authoring tools including those from the companies described above, and Web pages permitting the ordering of merchandise and at least one link to the authorizing computer 16.

In the first step of this program 17, represented by process block 18, a consumer using customer computer 10, contacts a Web site maintained by merchant computer 14 as indicated by message 20 according to techniques well known in the art. The merchant computer 14 provides message information 22 to the customer computer 10 describing an array of merchandise or services that may be purchased by the consumer through the customer computer 10. The consumer may prepare an order through the transmission of further messages 20 and the receipt of message information 22 in which merchandise or services (collectively termed "product") displayed on the Web site of the merchant computer 14 are selected and collected in an order held in memory (not shown) of merchant computer 14.

At the conclusion of this selection process, as indicated by decision block 24, the consumer using customer computer 10 provides a message 20 to the merchant computer 14 indicating a desired method of payment. Typically such methods will include check or credit card.

If a credit card is selected, the merchant computer 14 contacts the credit card company as indicated by decision branch 26 to obtain credit clearance according to methods well known in the art and not directly relevant to this invention. The credit card company will typically have a record of each consumer having its credit card identified by credit card number and based on a contractual agreement with the consumer. All transactions by that consumer using that credit card will be provided to the credit card company and thus the consumer's compliance with the contractual credit limit can be positively established and funds guaranteed to the merchant operating the merchant computer 14. The credit card company typically has prior knowledge of the creditworthiness of the consumer either through an application form filled out by the consumer or demographic studies on mailing lists performed by the credit card company.

Alternatively, if the consumer chooses to pay by check per the present invention, as indicated by decision branch 28, the merchant computer 14 links the customer computer 10 to the authorizing computer 16 as indicated by arrow 30, and process block 32 in FIG. 3, so that the customer computer 10 communicated directly with the authorizing computer 16.

The authorizing computer 16 requests information from the consumer operating the customer computer 10 via messages 34 the first of which requests that the customer indicate whether he or she has previously used the check authorizing service provided by the authorizing computer 16 as indicated by process block 37. The consumer may reply via messages 36 directly to the authorizing computer 16 indicating either that the customer operating the customer computer 10 is a new customer according to decision branch 38 or a previous customer as indicated by decision branch 40.

If the customer using customer computer 10 is a new customer, the program executed by the authorizing computer 16 proceeds to process block 42 and through messages 34 the customer is prompted to enter the bank routing number from a check from the consumer's checkbook and other identification including the bank name, street address, city, state and zip code and possibly other information. At process block 42, the customer also enters one or more of his or her driver's license number, state of issuance, area code, phone number and an Internet e-mail address, if available, as validating information stored in database 50 (shown in FIG. 2). As an alternative to the need for validating information, a so-called "cookie" previously placed on the customer computer 10 by the authorizing computer 16, as is understood in the art, may be used as the validating information.

Then at process block 44, by means of message 36, the customer is provided with a personal identification number or PIN.

Alternatively, if the customer has used the service before, the program 17 proceeds along decision branch 40 to process block 46 where the customer enters his or her PIN as previously provided and a validating driver's license number, state of issuance, area code, phone number and an Internet e-mail address, if available.

In either case, the program 17 executed on the authorizing computer 16 proceeds to process block 48 and the customer enters the amount of the check needed for the purchase with merchant and a check number. In an alternative embodiment, the merchant computer 14 at the time of the linking 30 can communicate the check amount from the purchase to authorizing computer 16 directly in the process of linking customer computer 10 to authorizing computer 16 and the customer, at process block 48, may simply validate that amount.

Figure 2:
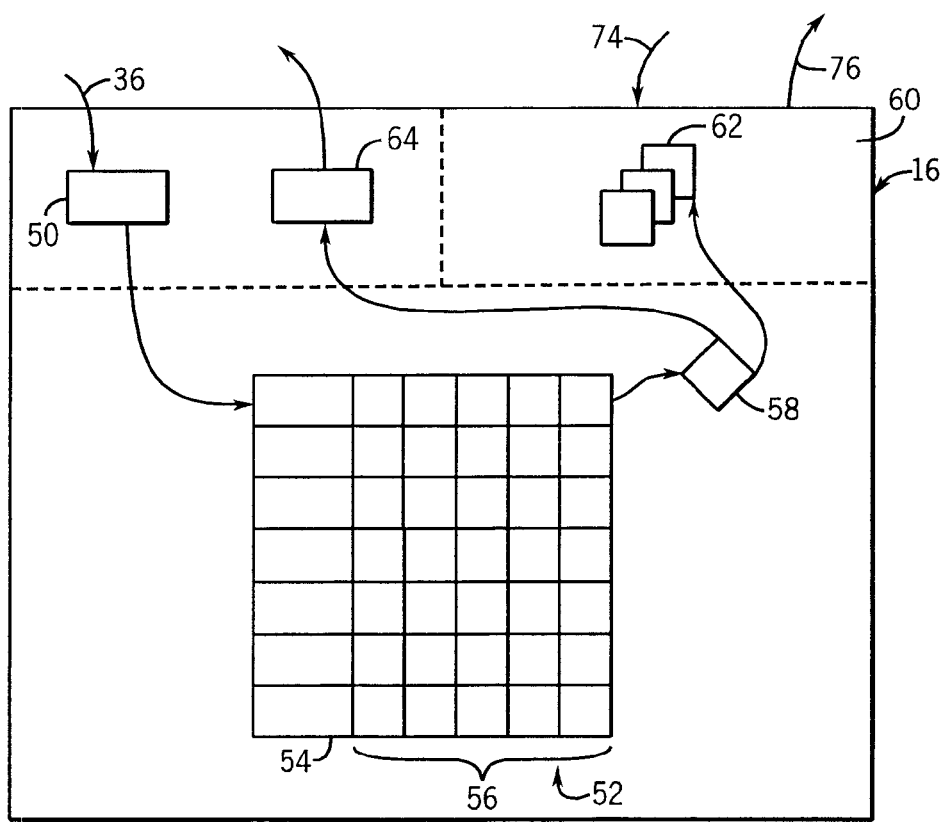
FIG. 2 is a block diagram of the memory structures of the authorization computer of FIG. 1 showing the paths of information flow.

Referring now to FIGS. 3 and 2, once the consumer has entered the necessary information through process blocks 42 or 46 and 48 via messages 36, the authorizing computer 16 confirms the PIN number by comparing it with previously stored data (from process block 42) such as the driver's license or phone number and area code or "cookie" contained in database 50 and, assuming there is a confirming match, uses the PIN number to index a statistical database 52 having a first column of PINs 54, each PIN linked to a second set of columns 56, holding statistical information. Generally, the statistical element may include information about the customer (such as a payment history), or about the transaction (the type and price of goods) or about the customer supplied data (legitimacy of driver license or check numbers) such as indicates the likelihood of a payment obligation by the customer being honored. Thus the statistical information may include information about the consumer and the transaction including some of the information previously provided by the consumer including bank name and account, driver's license number, state of issuance, area code and phone number and historical transaction data including occurrences of dishonored checks by that consumer, the amount of the purchase, the standard industrial classification of the merchant and the number of purchases within a particular date range. A modulus math check may be made of the incoming bank transit and routing number, using the MOD 10 approach. This approach adds together the mathematical value of all of the digits and adds an additional number necessary to make the total number achieved mathematically end in zero, and comparing the number that was added to achieve a number ending in zero to the ninth digit in the account number sequence. A probability of dis-honorment of payment obligations is indicated for any transaction that does not achieve a match. Further or alternatively, a comparison of the transit and routing numbers may be made to an active data base of all bank transit and routing numbers issued and still in use in the last three years, and/or a comparison of the phone number, account transit and routing number and or driver's license number, may be made to a national negative data base cross-referencing these three numbers to one another, and/or comparison of the transit and routing number on the check, the driver's license, phone number or a cross-reference of these three elements to one another overriding a negative record with a positive record from a file made up of consumers with previous payment dishonor history who have made payment restitution within a two week window may be made. Other statistical information may evaluate total price of identified product, the price and timing of previous purchases of other product using the unique customer identifier, the type of identified product; and the occurrence of any dis-honored payment associated with previous transactions using the customer identifier.

Other data reflecting creditworthiness may also be held in this table including the information of database 50 and this table is updated based on a history of transactions using the authorization services provided by the authorizing computer 16. For some rows of the database 52 there will be very little or no relevant data as there is no guarantee that a particular customer has ever performed a transaction using the service provided by the present invention.

The data of columns 56 for the particular row determined by the PIN number confirmed by the database 50 is provided to a decision filter 58 implemented as a set of threshold tests in software to determine whether it is likely that the check for the given amount will be honored. The operation of the decision filter 58 is indicated in FIG. 3 by process block 66. The decision filter 58 combines the various factors provided by columns 56 according to an empirically derived formula which is then applied to a threshold to make this decision.

If the decision is that the check will be honored, the decision algorithm communicates with a check folder 60 placing a virtual check 62 in the folder 60 for the proper amount. The creation of the virtual check 62 uses the bank and customer information previously entered by the customer at process block 42. The decision filter 58 also communicates with a message generator 64 indicating to the consumer via the web page of the authorizing computer 16 that a virtual check 62 has been processed and that the order will be completed. The operation of notifying the customer that the transaction has been successfully completed is indicated by process block 72.

Alternatively, if the operation of the decision filter 58 indicates that a check is not likely to be honored, no virtual check 62 is created and the message provided by the message generator 64 is that the check transaction cannot be completed and that the consumer should return to the Web site of the merchant computer 14 along link 75 (by pressing the "back" button on the customer's browser) to cancel the transaction or choose another payment means). The notification of the customer to return to the merchant's Web site and choose a different payment is indicated by process block 70.

Referring now to FIGS. 1-3, at periodic times, typically at least once per day, a merchant operating the merchant computer 14 reviews invoices collected by the ordering software that the merchant uses on merchant computer 14 collecting orders from various customer computer 10. For those orders which indicate a payment by check, the merchant then communicates with authorizing computer 16 via messages 74 requesting checks for those orders from folder 60. Only those orders for which virtual checks 62 exist will be honored by the merchant who takes the existence of the virtual check 62 as an indication that the checks will be honored and guaranteed by the operator of the authorizing computer 16. In this way, no direct communication between computers 16 and 14 at the time of order need be completed.

The authorizing computer 16 may transmit the virtual checks 62 to the merchant computer 14 via messages 76 to be printed on a standard check printer using magnetic ink and processed according to normal check processing techniques. It will be understood, however, that the check may be submitted through normal check processing channels, including but not limited to bank clearing houses, directly in virtual form without the need for printing of a check according to methods well understood in the art.

It will be understood that the indication to the merchant includes, at a minimum, an indication that the check is likely to be honored and thus is authorized by the operator of the authorizing computer 16 or an indication that the check is not likely to be honored and thus will not be authorized by the operator of the authorizing; computer 16. Normally the authorization is part of a contractual obligation to reimburse the merchant for certain failures to collect funds. It will be understood, however, that a third indication may be provided to the merchant via messages 76 including one indicating that no guarantee of fund payment will be made by the owner of authorizing computer 16 but that there is no indication to assume that the check will not or will be honored as a result of a lack of data in database 52.

The present system may also be used without the formality of processing checks simply by accepting some information such as a driver's license number and name to uniquely identify the customer and then applying the statistical information to the particular transaction to improve the change of accepting only payment obligations that will be honored.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. An Internet check payment computer system comprising:
   a merchant computer executing a stored program to communicate with the Internet to create an Internet site listing products for sale to the public and indicating an option for payment for the products by check drawn on funds held by a third party bank independent of the merchant;
   an anonymous customer computer independent from the merchant computer, and executing a stored program for communicating with the merchant computer over the Internet to identify the product desired to be purchased and to select the check payment option, the computer further transmitting at least one unique customer identifier from a customer over the Internet; and
   a processor computer independent from the customer computer and the merchant computer programmed to receive the at least one unique customer identifier in response to a selection of the payment by check option, the processor computer further including a data structure matching the unique customer identifier to at least one statistical element indicating a probability of a payment obligation by the customer being honored, the probability of a payment being honored being determined without communication with the third party bank,
   wherein the processor computer determines whether check payment for the product should be accepted based on the probability of the payment being honored, produces an authorization indication, and upon the authorization indication indicating that check payment should be accepted, transmits the authorization indication to the merchant computer and generates a printed check including the customer's name, the third party bank name, a check amount, and further including bank routing information,
   whereby the printed check may be processed at any location using standard check processing channels.

2. The Internet check payment computer system of claim 1 wherein the statistical element is based on a factor selected from a group consisting of a total price of the identified product, the price and timing of previous purchases of other products using the unique customer identifier, the type of identified product and the occurrence of any dishonored payment associated with the previous transactions using the unique customer identifier.

3. The Internet check payment computer system of claim 1 wherein the authorization indication provides the following responses:
   (1) an indication of not authorized, indicating that the acceptance of a check is not advised; and
   (2) an indication of authorized, indicating that the acceptance of a check is advised.

4. The Internet check payment computer system of claim 3, wherein the authorization indication indicating that an acceptance is advised further comprises the following responses:
   (1) an indication of authorized with no guarantee, indicating that the acceptance of a check is subject to the discretion of the merchant; and
   (2) an indication of authorized with a guarantee, indicating that the amount of the check will be guaranteed.

5. The Internet check payment computer system of claim 1 wherein the processor computer further transmits to a printer information to cause the printing of a check for the purchase of the merchandise.

6. The Internet check payment computer system of claim 1 wherein the statistical element is based on a total price of the identified product.

7. The Internet check payment computer system of claim 1 wherein the statistical element is based on the price and timing of previous purchases of other products using the unique customer identifier.

8. The Internet check payment computer system of claim 1 wherein the statistical element is based on the occurrence of any dishonored payment associated with the previous transactions using the unique customer identifier.

9. The Internet check payment computer system of claim 1 wherein the unique customer identifier is a driver's license number of a customer operating the customer computer.

10. The Internet check payment computer system of claim 1 wherein the unique customer identifier is selected from the group consisting of: a driver's license number, a phone number, a bank transit and routing number of an account of a customer operating the customer computer.

11. The Internet check payment computer system of claim 1 wherein the data structure further matches the unique customer identifier to the bank name, the customer name, and the bank routing information.

12. The Internet check payment computer system of claim 1 wherein the processor computer transmits the authorization indication contemporaneously with the selection of the check payment option.

* * * * *